US012217416B2

(12) United States Patent
Heidner et al.

(10) Patent No.: US 12,217,416 B2
(45) Date of Patent: Feb. 4, 2025

(54) CONTROL METHOD AND SYSTEM FOR SURFACE-SELECTIVE COATING OF AN INDIVIDUAL PHYSICAL DOCUMENT WITH A LIQUID COATING

(71) Applicant: Mühlbauer GmbH & Co. KG, Roding (DE)

(72) Inventors: René Heidner, Plauen (DE); Martin Dimpfl, Lam (DE)

(73) Assignee: Mühlbauer GmbH & Co. KG, Roding (DE)

( * ) Notice: Subject to any disclaimer, the term of this patent is extended or adjusted under 35 U.S.C. 154(b) by 39 days.

(21) Appl. No.: 18/459,496

(22) Filed: Sep. 1, 2023

(65) Prior Publication Data
US 2024/0078662 A1     Mar. 7, 2024

(51) Int. Cl.
| | | |
|---|---|---|
| G06K 15/02 | (2006.01) | |
| G06T 7/00 | (2017.01) | |
| G06T 7/50 | (2017.01) | |
| G06T 7/60 | (2017.01) | |
| G06T 7/90 | (2017.01) | |
| G06V 30/18 | (2022.01) | |

(52) U.S. Cl.
CPC ............ G06T 7/001 (2013.01); G06K 15/021 (2013.01); G06K 15/1822 (2013.01); G06K 15/1825 (2013.01); G06K 15/186 (2013.01); G06T 7/50 (2017.01); G06T 7/60 (2013.01); G06T 7/90 (2017.01); G06V 30/1801 (2022.01); *G06T 2207/10024* (2013.01); *G06T 2207/20081* (2013.01); *G06T 2207/30144* (2013.01); *G06T 2207/30176* (2013.01)

(58) Field of Classification Search
CPC ............ G06K 15/021; G06K 15/1822; G06K 15/1825; G06K 15/186; H04N 1/00034

USPC ................................................. 358/1.18
See application file for complete search history.

(56) References Cited

U.S. PATENT DOCUMENTS

| | | | |
|---|---|---|---|
| 2011/0109919 A1 | 5/2011 | Conlon et al. | |
| 2014/0071196 A1* | 3/2014 | Hihara | B41J 2/04553 347/17 |
| 2016/0307078 A1* | 10/2016 | Akazawa | G06K 15/1823 |

FOREIGN PATENT DOCUMENTS

| | | |
|---|---|---|
| DE | 102018117350 B4 | 5/2022 |
| KR | 1020180035296 | 4/2018 |

* cited by examiner

*Primary Examiner* — Kent Yip
(74) *Attorney, Agent, or Firm* — Wood Herron & Evans LLP

(57) ABSTRACT

A method is provided for surface-selective coating of a surface of an individual physical document, in particular a card-like document, with a liquid coating. The method includes: receiving or generating an actual image information by image sensors, which represents an actual image of the surface; and comparing the actual image information with reference image information, which represents a reference image of a reference surface corresponding to the surface, to determine, based on possible deviations between the actual image and the reference image, any deformation of the surface compared to the reference surface and to generate deformation information representing said deformation or alternatively the absence thereof. A coating device is then controlled based on coating information determined based on the deformation information and on geometry information that defines a target shape of a partial surface of the surface to be provided with the liquid coating.

20 Claims, 3 Drawing Sheets

CONTROL METHOD AND SYSTEM FOR SURFACE-SELECTIVE COATING OF AN INDIVIDUAL PHYSICAL DOCUMENT WITH A LIQUID COATING

CROSS-REFERENCE TO RELATED APPLICATION

This application claims priority to German Patent Application No 10 2022 209 198.1, filed Sep. 5, 2022. The above-mentioned patent application is incorporated herein by reference in its entirety.

TECHNICAL FIELD

This application relates to the field of liquid coating technology and includes a method for controlling (control method) a coating device and a system, each for surface-selective coating of a specific partial surface of a, in particular largely flat, surface of a specific individual physical document with a liquid coating.

BACKGROUND

A large number of different types of personalized documents, in particular in the form of cards or books, are known from the prior art. For example, book-like passport documents or individual pages thereof (such as the so-called "passport holder page" or paper pages), ID cards and many types of personalized chip cards, such as bank cards, credit cards, ID cards, membership cards, access authorization cards, etc. or personal (usually card-shaped) labels each belong to the group of personalized documents.

In addition, liquid coating methods are known, which are often referred to in technical jargon as "liquid coating" or as "liquid painting". These coatings are applied in layers in a liquid state, but dry out to a solid surface on their own or under targeted influences such as irradiation, and are therefore particularly easy and inexpensive to apply compared to other coatings, since the parts to be coated do not have to be heated or require other energy-intensive process steps. Liquid paints consist of a liquid carrier and solid components that remain after the paint has dried. The solid components of liquid paints usually include resins that provide the robust coating after drying, pigments that provide the color and additives that impart new properties, namely regulate the drying speed of the coating, increase UV protection or inhibit corrosion, for example.

One application of liquid coatings relates to the selective application of such a coating to a document surface, so that it is not coated completely, but only in an surface-selective manner, namely in places on a specific partial surface of the document surface, while at least one other surface region of the document surface is not provided with the coating.

The term "partial surface", as used herein, is to be understood as a real subset of the set of all points of a specific document surface. A partial surface can also have a number of disjunctive, in particular non-contiguous, surface portions.

In particular, documents of the aforementioned type can be used as individual physical documents to be coated for such a surface-selective coating. In this context, "individual" means that the document is or has been individualized in a controlled manner before the surface-selective coating, for example through personalization, or that it acquires individual properties at least partially uncontrolled in the course of its production, processing or storage process, which it can differentiate it from other documents processed in the same way. The latter can occur in particular if such a document deforms from its original shape before it is coated due to the process or other external influences such as temperature changes, usually in a way that cannot be precisely predicted. With regard to the aforementioned card-shaped documents, this can be the case in particular if these documents are designed as a laminate and their shape can change as a result of the lamination (deformation) before an surface-selective liquid coating is applied. It may be the case that a shape of the coating actually produced, which is perceptible when the document is viewed from above, deviates from its intended target shape due to the deformation of the document.

Thus, it would be desirable to further improve the quality that can be achieved with a liquid coating of documents, in particular of documents having a laminate, in particular with regard to the appearance of such documents.

SUMMARY

To achieve these purposes, a first set of embodiments of the invention provide a method, in particular a computer-implemented method, for surface-selective coating of a surface of an individual physical document, in particular a card-like document, with a liquid coating. The surface can in particular be a limited surface portion on the surface, in particular of the document, in particular a main page of the document or a surface portion of such a main page. In particular, the surface can be at least approximately flat (apart from a roughness in the sense of a shape deviation of the third to fifth order in the case of technical surfaces, in particular according to the German industrial standard DIN 4760). The method comprises:
(i) receiving or image sensory generating actual image information representing an actual image of the surface;
(ii) comparing the actual image information with reference image information, which represents a reference image of a reference surface corresponding to the surface, in order to determine any deformation of the surface with respect to the reference surface based on any deviations between the actual image and the reference image and to generate deformation information representing said deformation or alternatively the absence thereof;
(iii) depending on the deformation information and on geometry information (in particular from a reference layout) that defines a target shape of a partial surface of the surface to be provided with the liquid coating, determining coating information (in particular a coating layout) that defines the actual shape of a partial surface of the surface to be coated by surface-selective liquid coating of the surface; and
(iv) controlling a coating device in order to cause it to provide the surface of the document with the liquid coating surface-selectively in accordance with the coating information in the defined partial surface.

When determining the coating information, the actual shape of the partial surface is determined from the geometry information using a distortion of the target shape defined as a function of the deformation information in such a way that after the liquid coating has been carried out, the interaction of the actual shape of the coated partial surface with the shape of the surface in the region of the partial surface at least partially compensates for the distortion.

The term "information", as used herein in particular in the compound terms "actual image information" and "reference image information", "deformation information", "geometry information", "coating information" etc., refers in particular to any information that is machine-readable in any way with the respective defined properties (such as image information that represents an actual image of the surface). The respective information can be implemented in particular in the form of (particularly digital) data, for example as digital data stored on or in a storage medium (such as a file) or as a data stream.

The term "shape", as used in "actual shape" and "target shape", as used herein, is to be understood in particular as an indication that defines at least one aspect of a shape of a respective (partial) surface, in particular the shape of its contour or circumference. In particular, the shape can define a geometric shape and/or a size of the (partial) surface.

The term "individual physical document" as used herein means a material, namely a document having mass, and thus a "physical" document (in contrast to a digital document, which is only defined by data), that is individual in the sense that it distinguishes itself from similar documents, for example in the case of card-like documents from other such documents of the same type, recognizable with human senses.

In this context, "individual" means that the document is or has been individualized in a controlled manner before the surface-selective coating, for example through personalization, or that it acquires individual properties at least partially in an uncontrolled manner in the course of its production, processing or storage process, which can differentiate it from other documents processed in the same way. Such an individualization, in particular an uncontrolled one, can be caused in particular by manufacturing tolerances or subsequent changes, in particular under external influences. The aforementioned deformations of documents of the same type as a result of a lamination process that individually deforms the documents within the scope of manufacturing tolerances are an example. In particular, the document can be a security document such as an identity document, a bank or credit card or the like. In particular, it can be a so-called smart card with integrated electronics such as an integrated circuit.

The term "coating device" as used herein means a device that is set up to apply a liquid coating (liquid coating) to a document surface in order to produce a coating of the surface, in particular surface-selectively only in defined surface regions. The production of the coating comprises at least the application of the liquid coating, but can also include subsequent process steps, in particular a curing process (curing), for example using heat or electromagnetic radiation (in particular UV radiation).

The term "distortion", as used herein, is to be understood in particular as a deformation of the shape of a defined (partial) surface compared to a reference shape (target shape). This results in a falsification of the geometry, in particular the surface geometry, the geometry of the contour of the surface and/or the dimensions of the surface, compared to the corresponding geometry of the reference shape. Simple examples of such distortion are pincushion and barrel distortion, as are known in the fields of optics and computer graphics and in the display of geometric shapes, particularly rectangles, on cathode tubes.

"Interaction of the actual shape of the coated partial surface with the shape of the surface in the region of the partial surface", as used herein, means the superimposition of the distortion of the target shape to generate the actual shape with the (counter) distortion, which results from an uneven shape of the surface in the region of the partial surface. This superimposition means that the distortion of the target shape embodied in the actual shape is at least partially compensated for, so that the perceptible shape of the coated partial surface resulting from the superimposition is more similar to the target shape than the actual shape (without this overlay), and in particular coincides with the target shape—at least approximately.

As possibly used herein, the terms "comprises," "contains," "involves," "includes," "has," "having," or any other variant thereof are intended to cover non-exclusive inclusion. For example, a method or a device that comprises or has a list of elements is not necessarily restricted to these elements, but may involve other elements that are not expressly listed or that are inherent to such a method or device.

Furthermore, unless expressly stated to the contrary, "or" refers to an inclusive or and not to an exclusive "or". For example, a condition A or B is met by one of the following conditions: A is true (or present) and B is false (or absent), A is false (or absent) and B is true (or present), and both A and B are true (or present).

The terms "a" or "an" as possibly used herein, are defined in the meaning of "one or more". The terms "another" and "a further" and any other variant thereof are to be understood to mean "at least one other".

The term "plurality" as possibly used herein is to be understood to mean "two or more".

The terms "first," "second," "third," and similar terms in the specification and claims are used to distinguish between similar or otherwise like-named elements and are not necessarily descriptive of a sequential, spatial, or chronological order. It should be understood that the terms thus used are interchangeable under appropriate circumstances, and that the embodiments of the solution described herein may operate in different orders than those described or illustrated herein.

The term "configured" or "set up" to perform a specific function (and respective modifications thereof), possibly used herein, is to be understood to mean that the corresponding device or component thereof is already provided in a design or setting in which it can execute the function or that it is at least adjustable—namely configurable—so that it can execute the function after corresponding adjustment. The configuration can take place, for example, via a corresponding setting of parameters of a process course or of switches or the like for activating or deactivating functionalities or settings. In particular, the device can have multiple predetermined configurations or operating modes, so that the configuration can be carried out by selecting one of these configurations or operating modes.

In the method according to the first set of embodiments, an individualization of the document caused by a (controlled or uncontrolled) deformation of the relevant surface of the document is counteracted by pre-distorting the shape of the partial surface of the surface to be surface-selectively coated compared to its desired target shape such that this predistortion at least partially compensates for a distortion caused by the deformation, so that the resulting shape of the coated partial surface that can be perceived when looking at the surface-selectively coated surface approaches the target shape or ideally corresponds to it, at least essentially. In this way it is possible to create a plurality of documents of the same type which, despite such uncontrolled and/or document-specific deformations, have—at least essentially—the same appearance, in particular with regard to the shape of the coated partial surfaces. In this way, the quality that can be achieved with a liquid coating of documents, in particular of documents having a laminate, can be improved.

Various exemplary embodiments of the present solution, in particular of the method according to the first set of embodiments, are described in the following, which in each case, unless expressly excluded or technically impossible, can be combined as desired with one another and with other sets of embodiments of the solution.

In some embodiments, the geometry information is at least partially obtained from the actual image information by image processing. In particular, the coating information can be defined as a function of features of the actual image, in particular of individualization information (such as a personalization contained in the actual image). A coating of the surface region (partial surface) of the surface of the document which carries this individualization information (such as in the form of writing or symbol or photo) can then be brought about in a targeted manner.

In some embodiments, the geometry information is obtained (alternatively or additionally) at least partially from the reference image information by image processing. In particular, the coating information can be defined as a function of features of the reference image, in particular of an identifier that is the same for a plurality of documents to be coated (such as an identification of an issuer of the documents contained in the reference image, such as a bank card). A coating of the surface region (partial surface) of the surface of the document which carries this identifier (such as in the form of writing or symbol or photo) can then be brought about in a targeted manner. For example, in the case of a bank card as a document, such an identifier could be formed by a name or logo of the issuing bank and the above individualization information or personalization can be provided by a name and/or an account number of the (future) cardholder.

In this way, one and the same reference image information can be used in a particularly efficient manner for various purposes, on the one hand within the scope of determining any deformation of the surface compared to the reference surface and on the other hand to determine the target shape of the partial surface. In some embodiments, the method also comprises determining the geometry information depending on the result of an automatic analysis of a sample document realizing the target shape on its surface or of an image thereof using an analysis criterion characterizing the partial surface. In this case, the shape of a surface region corresponding to the partial surface on the sample document or its image is determined by the analysis and defined as the target shape. In particular, the surface of the sample element containing the surface region can also be used completely or partially as the reference surface. The analysis can then correspondingly comprise a sensory, in particular image sensory or distance sensory detection of this surface of the sample element as a reference surface for generating the reference image information. The use of a sample document thus makes it possible for the method to independently generate the geometry information and possibly also the reference image information, without this having to be determined and made available in advance outside of the method. The method is therefore also particularly flexible in handling, since a change in the geometric information or reference image information can be brought about simply by exchanging the sample document and subsequent analysis of the sample document can be carried out as part of the method.

In particular, according to some embodiments, the analysis criterion is or will be defined at least partially as a color-dependent criterion and the analysis then comprises determining the surface region by applying the color-dependent criterion to a color distribution on the sample document or its image.

This analysis can include, in particular, an evaluation of the color distribution in such a way that a region on the sample document or its image, the color of which corresponds to a specified reference color according to the color-dependent criterion or lies within a specified reference color range is identified as a surface region corresponding to the partial surface. For example, the surface region could have a specific color or a color from a specific predetermined color range of a defined color scheme or color space, so that during the analysis only the surface portions with this color or from this color range are determined as belonging to the surface region to be determined.

In some embodiments, in the case of sample documents with surface structure, the analysis criterion, is defined, alternatively or cumulatively with the aforementioned color-dependent criterion, at least in part as a surface structure-dependent criterion and the analysis comprises determining the surface region by applying the surface structure-dependent criterion with respect to a surface structure of the sample document or its image.

This analysis can in particular comprise an evaluation of the surface structure in such a way that a region on the sample document or its image the surface structure of which corresponds according to the surface structure-dependent criterion to a specified structure (in particular height, roughness or type of structure) or lies within a specified reference structure region (in particular height range, roughness range or type of structure) is identified as a surface region corresponding to the partial surface. For example, a height and/or depth structure of the surface in the region of the surface region, corresponding to a specific hatching, can serve as the type of structure.

In some embodiments, the target shape is determined using a shape recognition process in order to identify at least one shape element represented by the surface region from a predefined set of shapes as at least a partial target shape. In particular, predefined shapes can be used as the target shape, even if they are not complete or error-free on the sample document. The wealth of shapes can also be used in accordance with the aforementioned color-dependent or surface structure-dependent criteria alternatively or cumulatively with at least one of them as an analysis criterion for identifying the surface region.

In particular, the shape recognition process may include an optical character recognition (OCR) process to recognize at least one character represented by the region, such as a digit or a character of an alphabet or a character library, as at least a partial target shape. In particular, inscriptions on the sample document containing at least one defined character can be used to identify the surface region.

In some embodiments, the possible deformation of the surface compared to the reference surface and/or the coating information is determined using a machine-learning-based process trained for this purpose, in particular a correspondingly trained artificial neural network. A particularly flexible solution can thus be implemented, which can be used to determine a wide variety of deformations or to determine a wide variety of surface regions in view of obtaining the coating information.

In some embodiments, determining the possible deformation of the surface compared to the reference surface comprises determining a type and/or extent of the deformation of the surface and the coating information is determined as a function of the type and/or extent of the deformation determined in this way. For example, the extent of the deformation can be determined as a function of a specific local deviation of the surface from a flat initial state of the document or from a regression level or median level of the deformed surface determined by approximation or averaging. In particular, classification of a deformation as convex or concave deformation or a degree (such as an order) of an approximation of the deformation, for example by splines or polynomial approximation, can serve to define the type of deformation. In particular, a deformation can be quantified or classified in order to facilitate the subsequent determination of the actual shape by distortion from the target shape, in particular to automate it more easily.

In some embodiments, the coating information is determined on the basis of an image portion of the actual image that contains the partial surface but does not contain at least one other region of the actual image. The image portion is determined as a function of a determined variability of the actual shape within the context of an ensemble of several earlier executions of the method using documents of the same type as the present document. In this case, the image portion can in particular have a plurality of non-contiguous sub portions. This procedure has the advantage that, within the context of an ensemble consideration, it can be found out in which region the shape of the partial surface varies in the ensemble and also beyond the ensemble, as an overall approximation. The shape can indicate in particular the form, location (position and orientation) and/or size of the respective partial surface. As a result, the determination of the coating information can be limited to the image portion or variable image region determined in this way, which can be used to increase the efficiency and/or the performance of the method.

In some embodiments, determining the coating information comprises aligning the actual shape of the partial surface to be coated, represented by the coating information, with an orientation of the surface to be surface-selectively coated that is present during the application of the liquid coating and is particularly detected by sensors. In this way, it can be ensured that the coating is applied to the document in a correct intended orientation (and position) relative to the document, and coating errors or a corresponding discard are thus counteracted.

In some embodiments, determining the coating information comprises creating print data that define a print layout for the surface-selective liquid coating of the surface in the region of the determined partial surface. The coating device is controlled as a function of the print data in order to cause the coating device to provide the surface surface-selectively with the liquid coating by printing in the region of the surface assigned to the partial surface in the print layout. Because of the high level of accuracy and flexibility that can be achieved by printing, for example inkjet printing, with regard to the printed image, particularly precise liquid coatings can be achieved.

In particular, the creation of the print data can include converting a color scheme already defined by the actual image information in the region of the determined partial surface or a new definition of a color scheme for this region, in each case for the print layout. If, for example, in the actual image the region to be coated has a certain coloring (such as green), then the print layout can be defined in such a way that it receives a gray value or black/white value assigned to the coloring in the region of the determined partial surface. This is particularly useful if the original coloring from the actual image cannot be represented with the liquid used for the coating. This can be the case in particular if the liquid has a high level of transparency or is even colorless.

In some embodiments, a document that has already been pre-printed or preformed in a controlled manner on the surface is used as the document to be provided with the liquid coating. This has the particular advantage that the pre-printing or a shape or surface structure created by the pre-deformation can be used to determine a (different), in particular uncontrolled, deformation of the document as part of the comparison of the actual image information with the reference image information.

In some embodiments, a card-like document, in particular a security document, is used as the document to be provided with the liquid coating. Especially with card-like documents, such as smart cards or ID documents or data pages of ID cards, the document usually has a multi-layer laminate made of layers of different materials, so that uncontrolled deformations can normally occur during lamination or storage of the documents before coating, so that the method can be used particularly profitably in this case.

A second set of embodiments of the present application relates to a system for surface-selectively coating a partial surface of a surface of an individual physical document with a liquid coating. The system comprises: (i) a data processing device; and (ii) a coating device, which can be controlled by the data processing device, for the selective liquid coating of surfaces. The data processing device is configured to carry out the method according to the first set of embodiments and to control the coating device according to the method in order to cause it to provide the surface of the document with the liquid coating surface-selectively in the defined partial surface according to the coating information.

A third set of embodiments of the present application relates to a computer program or computer program product, in particular a non-volatile computer-readable storage medium, each with instructions which, when executed on a computer or on a multi-computer platform, cause the latter to execute the method according to the first set of embodiments.

The computer program can in particular be stored on a non-volatile data carrier. Preferably it is a data carrier in the form of an optical data carrier or a flash storage module. This can be advantageous if the computer program as such is to be handled independently of a processor platform on which the one or more programs are to be executed. In another implementation, the computer program can be present as a file on a data processing unit, in particular on a server, and can be downloaded via a data connection, for example the Internet or a dedicated data connection, such as a proprietary or local network. In addition, the computer program can have a plurality of interacting individual program modules. In particular, the modules can be configured or at least used in such a way that they are executed in the sense of distributed computing on different devices (such as computers or processor units) that are geographically remote from one another and connected to one another by a data network.

The system can accordingly have a memory in which the computer program is stored. Alternatively, the system can also be set up to access a computer program available externally, for example on one or more servers or other data processing units, via a communication connection, in particular in order to exchange data with therewith, which data are used during the execution of the method or computer program or represent outputs of the computer program.

The features and advantages explained with respect to the first set of embodiments of the invention also apply correspondingly to the other sets of embodiments of the invention without departing from the scope of the invention.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

In the figures, the same reference numbers denote the same, similar or corresponding elements. Elements depicted in the figures are not necessarily represented to scale. Rather, the various elements shown in the figures are presented in such a way that their function and general purpose can be understood by those skilled in the art. Connections and couplings, shown in the figures, between functional units and elements can also be implemented as an indirect connection or coupling, unless expressly stated otherwise. Unless specifically stated otherwise, functional units can be implemented in particular as hardware, software or a combination of hardware and software.

Figure 1:
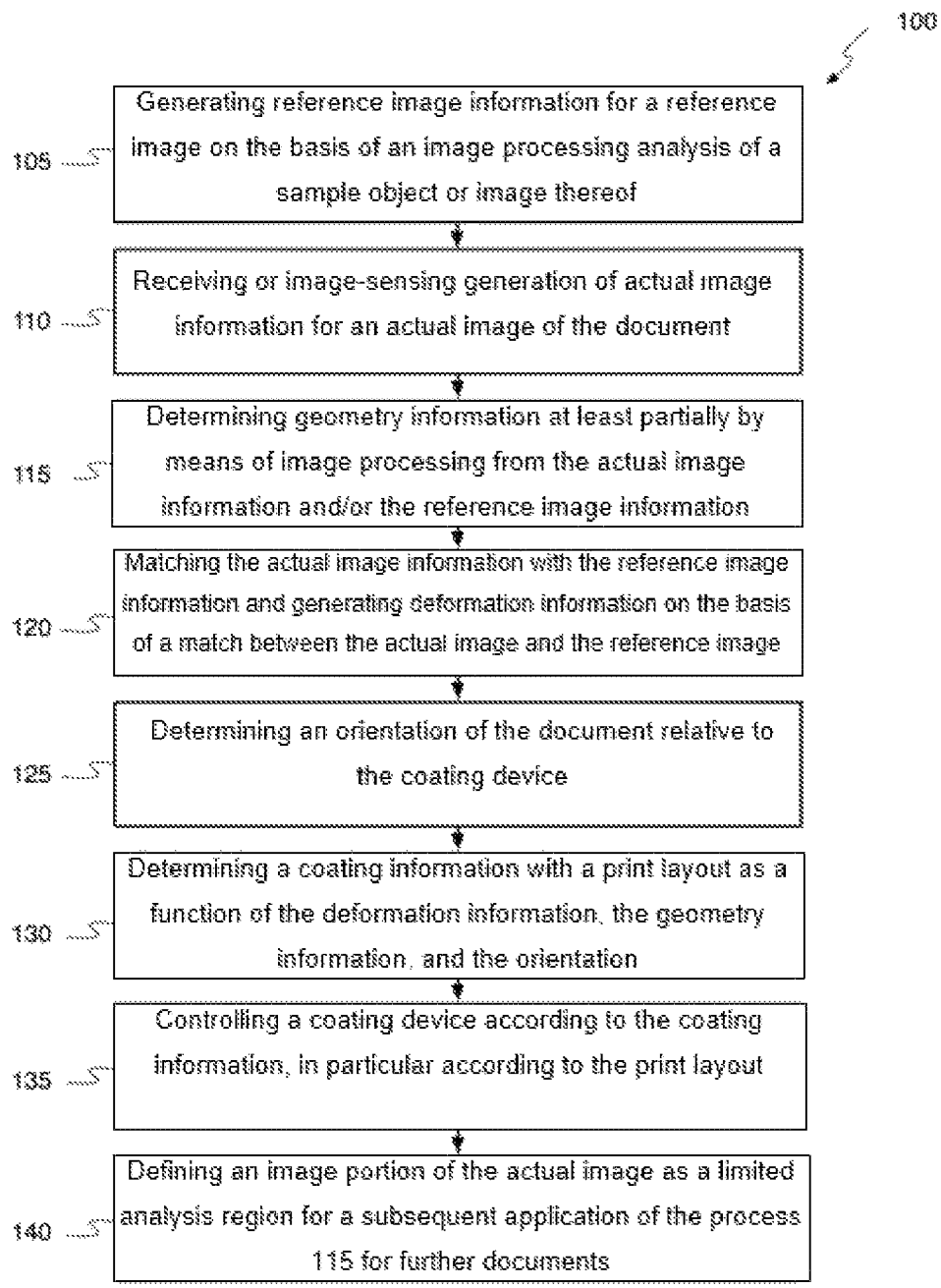
FIG. 1 schematically shows a flowchart to illustrate an exemplary embodiment of the method according to one embodiment of the invention.
Figure 2:
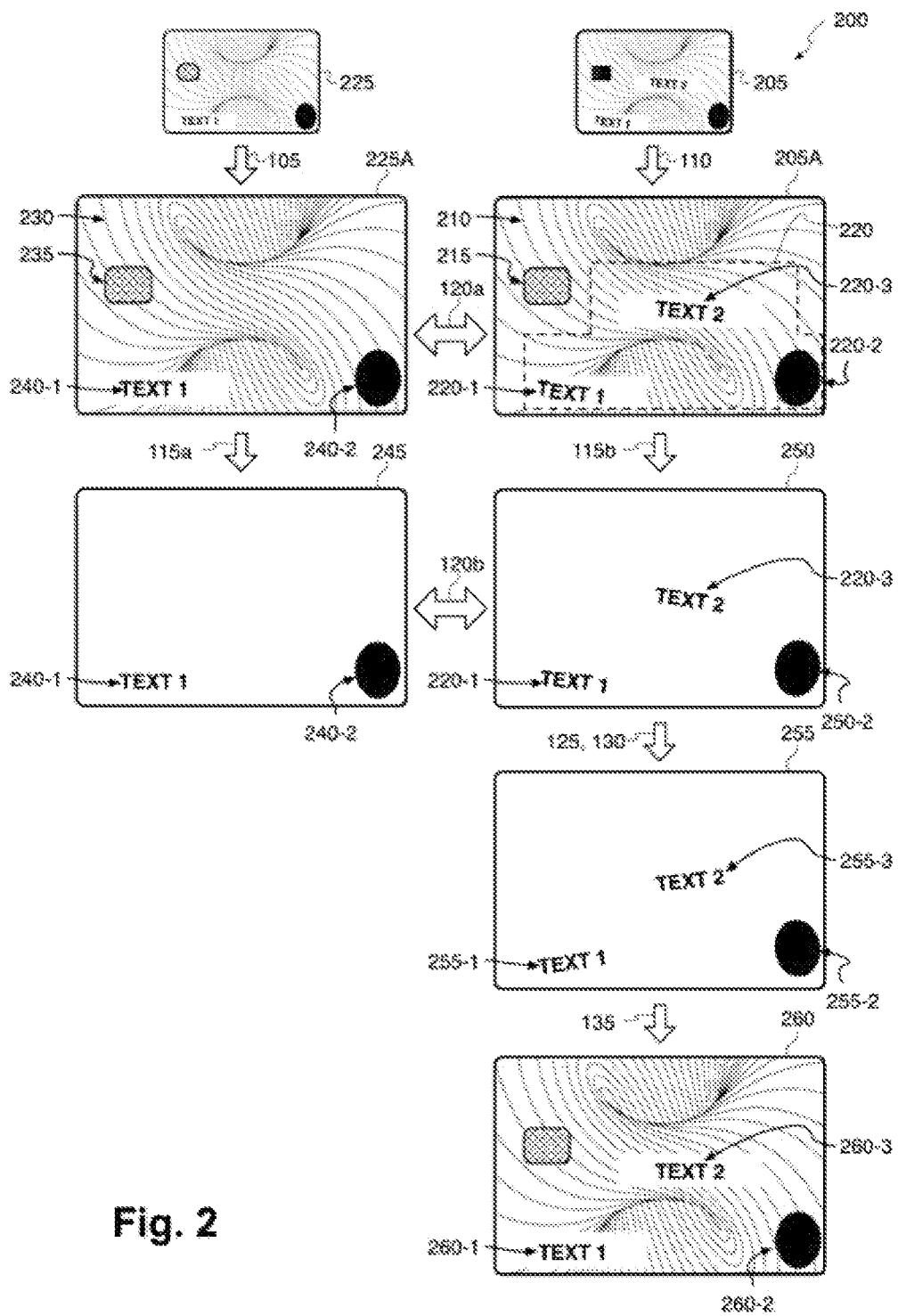
FIG. 2 shows a schematic sequence of intermediate states of a document to be coated, corresponding to the method from FIG. 1.

FIG. 1 illustrates an exemplary embodiment 100 of the method for controlling a coating device for surface-selectively coating a surface of an individual physical document with a liquid coating. For this purpose, FIG. 2 illustrates a sequence 200 of different intermediate states that are reached as part of the method 100. For this reason, reference is also made to FIG. 2 in the description of method 100.

As part of method 100, reference image information is generated in a process 105 based on an in particular card-like sample document 225 (or an image, in particular photos thereof), which information, as reference image 225A, represents an image of a reference surface serving as an error-free reference of sample document 225. The reference image information or the reference image 225A can be obtained in particular by (digital) photographing the surface of the sample document, preferably in the form of digital image data.

The reference image 225A shows a pre-printed background image 230, a representation of an electronic chip 235, which is integrated in the sample document, as well as an identifier composed of a text element 240-1, and a graphic element 240-2, which identifier is present on a plurality, in particular several different documents v to be coated according to the method. For example, this can be the name and a logo of an issuer of the document, for example in the case of a bank or credit card of a bank or a credit card company.

In a further process 115*a*, the two image elements 240-1 (text element) and 240-2 (graphic element) are extracted from the reference image 225A by image processing using a color-dependent analysis criterion. According to the analysis criterion, the image elements 240-1 and 240-2 to be extracted are characterized by a certain predefined color (shown as black surface in the figures), which differs from the color of the background image 230. Instead of a single color, a specific color range in a defined color space (such as RGB) can also be used as a color-dependent analysis criterion, so that only image elements are extracted, the coloring of which lies within this color range.

Alternatively or cumulatively with a color-dependent analysis criterion, a surface structure-dependent analysis criterion can also be used, so that only surface regions or image elements which have a surface structure detected by sensors, which correspond to a specified surface structure (such as roughness or material property) or lie within a specified reference structure region, are extracted as image elements or surface regions to be coated.

In addition, alternatively or cumulatively, a form recognition process can be used in order to recognize at least one form element represented in the reference image 225A from a predefined set of forms as at least a partial target form. This makes sense in particular with regard to the recognition of text elements or other predefined characters or character chains (such as using OCR technology), in which case the range of shapes (alphabet, for example) can serve as an analysis criterion.

In process 115*a*, geometry information 245 is generated using the analysis criterion, which information represents, for example in the form of a layout, these two image elements 240-1 and 240-2 and their respective position and orientation within reference image 225A (in the form of corresponding data). The image elements 240-1 and 240-2 at least partially define a target shape (in particular form) of a partial surface of the surface of at least one document 205 to be provided with a liquid coating, but typically of a plurality of such documents 205 of the same type. The target shape accordingly comprises here at least the two non-contiguous surface regions 240-1 and 240-2.

The processes 105 and 115*a* can in particular be carried out before the further process steps described below.

The method 100 also comprises a process 110 in which image information ("actual image information") is generated by image sensors with a vision system (in particular a camera) or is received in the form of image data from a data source, wherein the image information represents an image ("actual image") 205A of a relevant surface of a document 205 to be coated.

The actual image 205A has a pre-printed background image 210, a representation of an electronic chip 215, which is integrated in the document 205, as well as an identifier composed of a text element 220-1, and a graphic element 220-2, which identifier is present on a plurality, in particular several different documents 205 to be coated according to the method. For example, as in sample document 225, this can be the name and a logo of an issuer of the document, for example in the case of a bank or credit card of a bank or a credit card company. In addition, the actual image 205A contains a further image element 220-3, which is document-specific information (in particular personalization) that is not already present on the sample document 225 or its image 225A. The actual image 205A thus differs from the reference image 225A at least by the image element 220-3. A further difference, however, in the present example of FIG. 2 is that due to a deformation of the surface of the document 205, the image elements 220-1 to 220-3 in a plan view of the document 205 and correspondingly in its image (actual image) 205A appear distorted (illustrated here by a skewing of the picture elements), while they appear undistorted in the reference image 225A.

In a first embodiment variant of the method 100, the actual image 205A is compared with the reference image 225A as part of a process 120*a* in order to be able to use any deviations to infer a potential deformation of the document 205 or its surface compared to a flat shape. In the present example, the distortions in the actual image 205A with regard to the image elements 220-1 and 220-2 compared to the corresponding image elements 240-1 or 240-2 are recognized and a type and extent of a corresponding deformation is reconstructed and used as the resulting deformation information (in data form). This can be done in particular by a suitably adapted machine-learning-based process, such as using a suitably trained artificial neural network.

In a further process 115*b*, similar to process 115*a*, such image elements 220-1 to 220-3 which correspond to the analysis criterion are extracted using an analysis criterion which can correspond in particular to that from process 115*a*.

According to a second embodiment variant of the method 100, instead of the process 120*a*, a process 120*b* takes place to compare the geometric data 245 resulting from the process 115*a* with the geometric data 250 resulting from the process 115*b* in order to correspondingly, as described above, recognize a potential deformation of the document 205 and to generate corresponding deformation information. The use of process 120*b* instead of process 120*a* has the advantage that the comparison can already be carried out on the basis of the extracted image elements and thus without taking into account the full complexity of images 225A and 205A including their other image contents (210, 215, 230, 235).

The target shape of the liquid coating to be produced is then obtained by combining the geometric information 245 and 250, so that the target shape contains the image elements 240-1, 240-2 and additionally the image element 220-3. It should be pointed out that depending on the application and embodiment of the method, the target shape can also be derived exclusively from the geometry information 245 or from the geometry information 250 or can be defined thereby. The former makes sense in particular when only surface regions of the document 205 are to be coated which are already represented by corresponding image elements in the reference image 225A, while the latter is particularly relevant when surface regions are to be coated with document-specific information. Insofar as mutually corresponding image elements are contained in the two items of geometry information 245 and 250, preferably only one of them is adopted in each case in order to avoid duplication.

In a further process 125, in particular on an optical basis, an orientation of the document 205 to be coated relative to the coating device used for its coating can be detected by sensors. Thus, in particular, any deviation from a target alignment can be recognized and taken into account in a further process 130 in the subsequent definition of a coating information 255 that defines a coating layout.

In the process 130, the previously obtained geometry information defining the target shape, the determined orientation of the document 205 and the deformation information serve as input variables. As a result, the process 130 supplies the coating information 255, which in particular represents a coating layout for a liquid coating to be applied to the document 205 by a coating device. Depending on the deformation information, as part of process 130, image elements 220-1 to 220-3 are included in the image information or in the coating layout in such a distorted form that this distortion at least partially compensates the deformation-related distortion of these image elements in actual image 205A or in the geometry information 250 (similar to how a barrel distortion as counter-distortion can compensate an original pincushion distortion). The generation of the coating information can, in particular, also include a conversion in the sense that a coloring of the partial surface to be coated that is optionally contained in the geometry information and is defined by the actual image information is converted into a different "coloring", in particular black/white or shades of gray, in order to control the application of the liquid coating. The new coloring can then encode in particular a location-dependent variable thickness of the liquid coating to be applied or a coloring of the same.

A further process 135 follows, in which a coating device is controlled in accordance with the coating information in order to provide the surface of the document 205 with a liquid coating in accordance with the coating layout. The coated document 260 thus results in that the original deformation-related distortion of the image elements 220-1 to 220-3 is at least partially, ideally as here completely, compensated (cf. undistorted image elements 260-1 to 260-3).

The target shape of the liquid coating to be produced is then obtained by combining the geometric information 245 and 250, so that the target shape contains the image elements 240-1, 240-2 and additionally the image element 220-3. It should be pointed out that depending on the application and embodiment of the method, the target shape can also be derived exclusively from the geometry information 245 or from the geometry information 250 or can be defined thereby. The former makes sense in particular when only surface regions of the document 205 are to be coated which are already represented by corresponding image elements in the reference image 225A, while the latter is particularly relevant when surface regions are to be coated with document-specific information.

In a further process 125, in particular on an optical basis, an orientation of the document 205 to be coated relative to the coating device used for its coating can be detected by sensors. Thus, in particular, any deviation from a target alignment can be recognized and taken into account in a further process 130 in the subsequent definition of a coating information item 255 that defines a coating layout.

In the process 130, the previously obtained geometry information defining the target shape, the determined orientation of the document 205 and the deformation information serve as input variables. As a result, the process 130 provides the coating information 255, which in particular represents a coating layout for a liquid coating to be applied to the document 205 by a coating device and defines a shape ("actual shape") of the surface regions to be coated (combined: "partial surface"). Depending on the deformation information, as part of process 130, image elements 220-1 to 220-3 are included in the image information or in the coating layout in such a distorted form that this distortion at least partially compensates the deformation-related distortion of these image elements in the actual image 205A or in the geometry information 250 (similar to how a barrel distortion as counter-distortion can compensate an original pincushion distortion). Also this process 130 can be performed in particular by a suitably adapted machine-learning-based process, such as using a suitably trained artificial neural network.

A further process 135 follows, in which a coating device is controlled in accordance with the coating information in order to provide the surface of the document 205 with a liquid coating in accordance with the coating layout. The coated document 260 thus results in that the original deformation-related distortion of the image elements 220-1 to 220-3 is at least partially, ideally as here completely, compensated (cf. undistorted image elements 260-1 to 260-3). The surface-selective coating takes place here only in the region of the surface regions representing the image elements 255-1 to 255-3 (collectively: "partial surface"), while the other regions of the surface of the document 260 resulting from the coating from document 205 remain uncoated.

Optionally, only one further process 140 can follow, in that a limited image portion 220 is identified in the actual image on the basis of the results of process 115b, within which the image elements 220-1 to 220-3 extracted according to the analysis criterion lie. This image portion 220 can now be defined as an image analysis region for subsequent further method executions with regard to further documents in such a way that the process 115b is carried out there only with regard to this limited image analysis region. The process 140 can also be defined in such a way that it refers to an entire ensemble of previous executions of the process 115b including the last process run carried out in relation to document 205 and defines the image analysis region based on a plurality, in particular all, of the corresponding image portions from this ensemble of process runs. The process 140 is or can be defined accordingly in particular in such a way that the currently determined image portion is compared with an image portion resulting from earlier process runs of this process, and an adjustment of the image portion only takes place if the last determined image portion extends beyond the image portion resulting from earlier process runs.

Figure 3:
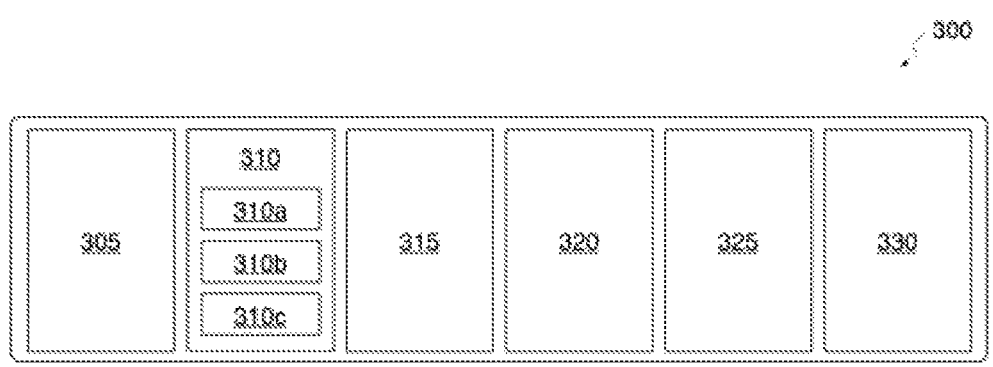
FIG. 3 shows a schematic "black box" illustration of an exemplary embodiment of a system for carrying out a method such as the method from FIG. 1.

Finally, FIG. 3 illustrates an exemplary system 300 for performing the method 100 comprising a coating process controlled according to the process 135 itself.

The system 300 has a plurality of modules 305 to 325 connected in series within the framework of a processing path and is configured in particular to carry out the method 100. A first module is configured as an input module 305 and is used to receive the documents to be coated, which can be supplied in particular as a stack of documents, and then to supply them individually to the next module 310 for further processing. Furthermore, the input module 305 can also be configured to receive a sample document 225 and to supply it to the module 310. For this purpose, either the same transport route can be used as for documents 205, or a separate, dedicated transport route for sample documents 225 can be used.

Module 310 is a module configured for image acquisition and process control. In particular, it can have a processor platform 310a with one or more processors, an associated program and data memory 310b and an image sensor system (in particular a camera) 310c for generating the actual image information and the reference image information. A computer program is stored in the memory 310b, which is designed and configured to be executed on the processor platform 310a in order to control the system 300 in such a way that it executes the method 100. The processor platform 310a and the data storage together form a data processing device.

The next module 315 along the processing path is configured as a module for chip coding of the chip 215 on the document 205. In particular, this can be done using contacts or wirelessly, depending on the type of document 205 and/or the corresponding communication capability of the system 300.

The further module 320 follows along the processing path, which is configured, under corresponding control by the computer program, to carry out a surface-selective liquid coating (including application and curing of the coating, in particular by irradiation with ultraviolet light (UV)) of the document 205. The module 320 accordingly represents a coating device within the meaning of the method 100 and can be configured in particular for printing the document 205 with the liquid coating, for example as an inkjet printer.

The next module is a module 325 for quality control, which in turn can have an image sensor system, such as a photo or video camera, in order to capture and check the coated documents 260 (see FIG. 2) using an image sensor for quality control purposes.

Finally, there follows an output module 330 for the coated documents 260, which can be configured in particular in such a way that, depending on the results of the quality control carried out in module 325, it outputs error-free documents on the one hand and faulty documents on the other hand, in different ways. In particular, documents with errors can be ejected from the process flow before the documents recognized as being error-free are output, which can in particular include a stacking of the documents to be output.

While at least one exemplary embodiment has been described above, it is to be noted that a large number of variations thereto exist. It is also to be noted that the exemplary embodiments described only represent non-limiting examples, and are not intended to restrict the scope, the applicability, or the configuration of the devices and methods described herein. Rather, the preceding description will provide those skilled in the art with guidance for implementing at least one exemplary embodiment, wherein it is apparent that various changes in the operation and arrangement of elements described in an exemplary embodiment may be made without departing from the scope of the subject matter defined in the appended claims and its legal equivalents.

What is claimed is:

1. A method for controlling a coating device for surface-selective coating of a surface of an individual physical document with a liquid coating, wherein the method comprises:
   receiving, or generating by image sensors, actual image information representing an actual image of the surface;
   comparing the actual image information with reference image information, which represents a reference image of a reference surface corresponding to the surface, in order to determine any deformation of the surface with respect to the reference surface based on any deviations between the actual image and the reference image and to generate deformation information representing said deformation or an absence thereof;
   determining, depending on the deformation information and on geometry information which defines a target shape of a partial surface of the surface to be provided with the liquid coating, a coating information which defines an actual shape of a partial surface of the surface to be coated by surface-selective liquid coating of the surface; and
   controlling a coating device to cause the coating device to provide the surface of the document with the liquid coating in the defined partial surface in a surface-selective manner in accordance with the coating information;
   wherein, when determining the coating information, the actual shape of the partial surface is determined from the geometry information using a distortion of the target shape defined as a function of the deformation information in such a way that, after the liquid coating has been carried out, an interaction of the actual shape of the coated partial surface with the shape of the surface in a region of the partial surface at least partially compensates for the distortion.

2. The method of claim 1, wherein the geometry information is at least partially obtained by image processing from the actual image information.

3. The method of claim 1, wherein the geometry information is at least partially obtained by image processing from the reference image information.

4. The method of claim 1, further comprising:
determining the geometry information as a function of a result of an automatic analysis of a sample document realizing the target shape on its surface or an image thereof using an analysis criterion characterizing the partial surface, wherein the analysis determines a shape of a surface region corresponding to the partial surface on the sample document or its image and defines the shape of a surface region corresponding to the partial surface as the target shape.

5. The method of claim 4, wherein the analysis criterion is or can be defined at least partially as a color-dependent criterion and the analysis involves determining the surface region by using the color-dependent criterion with regard to a color distribution on the sample document or its image.

6. The method of claim 5, wherein the analysis comprises an evaluation of the color distribution in such a way that a region on the sample document or its image, a color of which corresponds to a specified reference color according to the color-dependent criterion or is within a specified reference color range, is identified as a surface region corresponding to the partial surface.

7. The method of claim 4, wherein the analysis criterion is defined at least in part as a surface structure-dependent criterion and the analysis involves determining the surface region by applying the surface structure-dependent criterion with respect to a surface structure of the sample document or its image.

8. The method of claim 7, wherein the analysis comprises evaluating the surface structure in such a way that a region on the sample document or its image, the surface structure of which corresponds to a predetermined structure according to the surface structure-dependent criterion or lies within a predetermined reference structure region, is identified as a surface region corresponding to the partial surface.

9. The method of claim 4, wherein the determining of the target shape is carried out using a shape recognition process in order to recognize at least one shape element represented by the surface region from a predefined set of shapes as at least a partial target shape.

10. The method of claim 9, wherein the shape recognition process comprises an optical character recognition, OCR, process to recognize at least one character represented by the surface region as at least a partial target shape.

11. The method of claim 1, wherein the determining of the possible deformation of the surface compared to the reference surface and/or the determining of the coating information takes place using a machine-learning-based process trained for this purpose.

12. The method of claim 1, wherein the determining of the possible deformation of the surface compared to the reference surface comprises determining a type and/or extent of the deformation of the surface and the coating information is determined as a function of the type and/or extent of the deformation determined in this way.

13. The method of claim 1, wherein:
the coating information is determined on the basis of an image portion of the actual image which contains the partial surface but does not include at least one other region of the actual image; and
the image portion is determined as a function of a determined variability of the actual shape within an ensemble of several earlier executions of the method using documents of the same type as document.

14. The method of claim 1, wherein the determining of the coating information comprises an aligning of the actual shape of the partial surface to be coated represented by the coating information with respect to an orientation of the surface to be coated surface-selectively, which orientation is present during application of the liquid coating.

15. The method of claim 1, wherein:
determining the coating information comprises creating print data which define a print layout for the surface-selective liquid coating of the surface in a region of the determined partial surface; and
the coating device is controlled as a function of the print data in order to cause the coating device to provide the surface surface-selectively with the liquid coating by printing in the region of the surface associated to the partial surface in the print layout.

16. The method of claim 15, wherein creating the print data comprises converting a coloring already defined by the actual image information or newly defining a coloring, in each case for the print layout.

17. The method of claim 1, wherein a document which has already been preprinted or preformed in a controlled manner on the surface is used as the document to be provided with the liquid coating.

18. The method of claim 1, wherein a card-like document is used as the document to be provided with the liquid coating.

19. A system for surface-selective coating of a partial surface of a surface of an individual physical document with a liquid coating, wherein the system comprises:
a data processing device; and
a coating device, which can be controlled by the data processing device, for selective liquid coating of surfaces;
wherein the data processing device is configured to carry out a method comprising:
receiving, or generating by image sensors, actual image information representing an actual image of the surface;
comparing the actual image information with reference image information, which represents a reference image of a reference surface corresponding to the surface, in order to determine any deformation of the surface with respect to the reference surface based on any deviations between the actual image and the reference image and to generate deformation information representing said deformation or an absence thereof;
determining, depending on the deformation information and on geometry information which defines a target shape of a partial surface of the surface to be provided with the liquid coating, a coating information which defines an actual shape of a partial surface of the surface to be coated by surface-selective liquid coating of the surface; and
controlling a coating device to cause the coating device to provide the surface of the document with the liquid coating in the defined partial surfacer in a surface-selective manner in accordance with the coating information;

wherein, when determining the coating information, the actual shape of the partial surface is determined from the geometry information using a distortion of the target shape defined as a function of the deformation information in such a way that, after the liquid coating has been carried out, an interaction of the actual shape of the coated partial surface with the shape of the surface in a region of the partial surface at least partially compensates for the distortion.

20. A computer program product comprising instructions stored on a non-transitory computer readable medium which, when executed on a computer or on a multi-computer platform, cause the computer or the multi-computer platform to perform a method comprising:

receiving, or generating by image sensors, actual image information representing an actual image of the surface;

comparing the actual image information with reference image information, which represents a reference image of a reference surface corresponding to the surface, in order to determine any deformation of the surface with respect to the reference surface based on any deviations between the actual image and the reference image and to generate deformation information representing said deformation or an absence thereof;

determining, depending on the deformation information and on geometry information which defines a target shape of a partial surface of the surface to be provided with the liquid coating, a coating information which defines an actual shape of a partial surface of the surface to be coated by surface-selective liquid coating of the surface; and controlling a coating device to cause the coating device to provide the surface of the document with the liquid coating in the defined partial surface in surface-selective manner in accordance with the coating information;

wherein, when determining the coating information, the actual shape of the partial surface is determined from the geometry information using a distortion of the target shape defined as a function of the deformation information in such a way that, after the liquid coating has been carried out, an interaction of the actual shape of the coated partial surface with the shape of the surface in a region of the partial surface at least partially compensates for the distortion.

* * * * *

UNITED STATES PATENT AND TRADEMARK OFFICE
CERTIFICATE OF CORRECTION

PATENT NO.         : 12,217,416 B2
APPLICATION NO.    : 18/459496
DATED              : February 4, 2025
INVENTOR(S)        : Rene Heidner et al.

It is certified that error appears in the above-identified patent and that said Letters Patent is hereby corrected as shown below:

On the Title Page

Column 1, Item (30) Foreign Application Priority Data is missing, and should read -- Sep. 5, 2022 (DE) ..... 10 2022 209 198.1 --.

Signed and Sealed this
Twenty-fifth Day of March, 2025

Coke Morgan Stewart
*Acting Director of the United States Patent and Trademark Office*